L. T. RHOADES.
TRANSMISSION GEAR FOR AUTOMOBILES AND OTHER MACHINERY.
APPLICATION FILED JAN. 3, 1908.
934,016.
Patented Sept. 14, 1909.
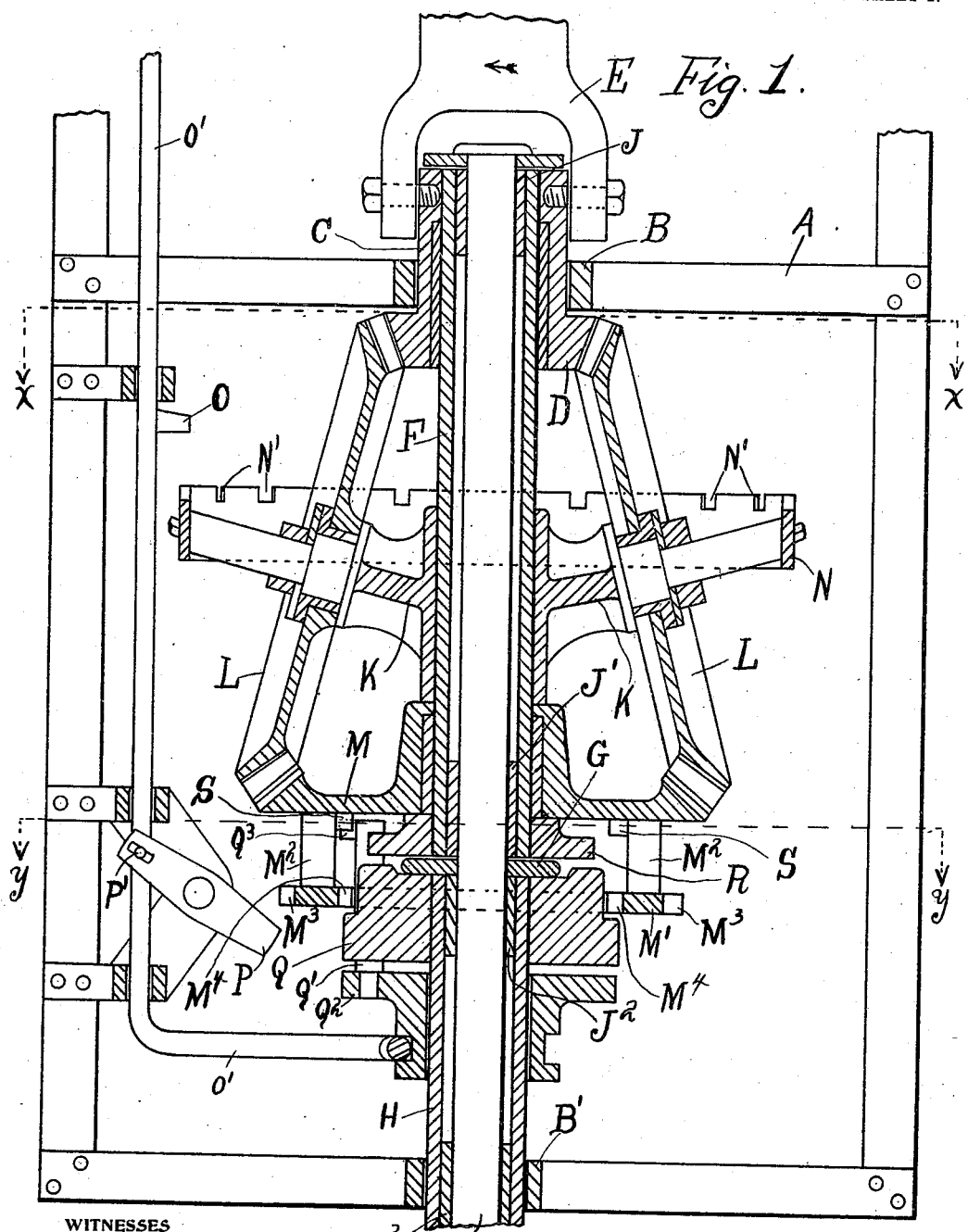

L. T. RHOADES.
TRANSMISSION GEAR FOR AUTOMOBILES AND OTHER MACHINERY.
APPLICATION FILED JAN. 3, 1908.
934,016.
Patented Sept. 14, 1909.
2 SHEETS—SHEET 2.
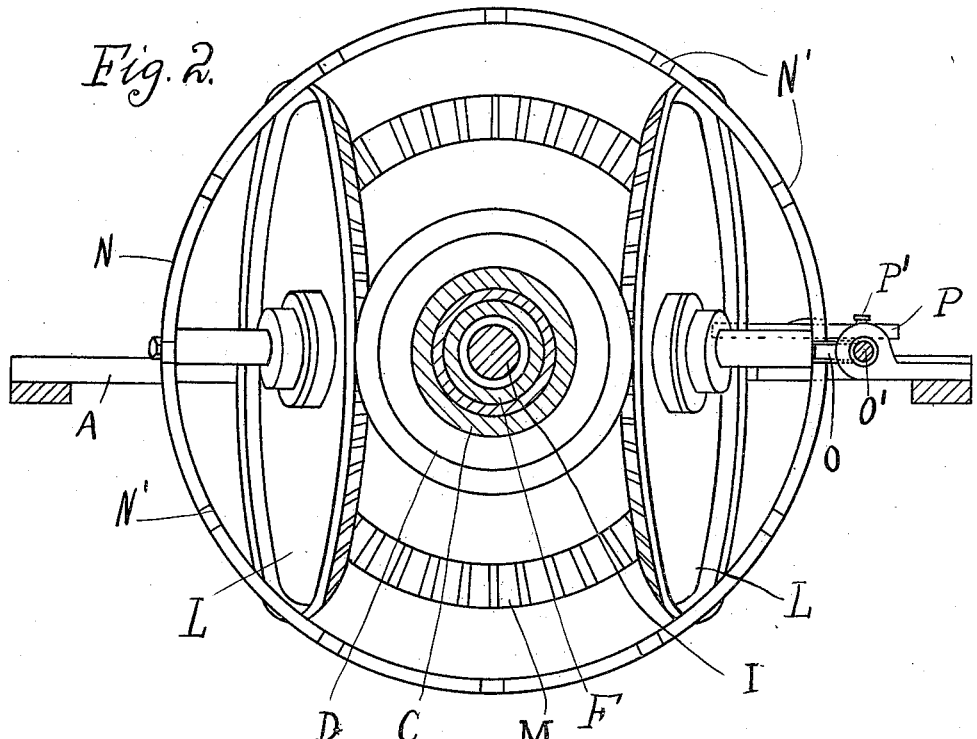
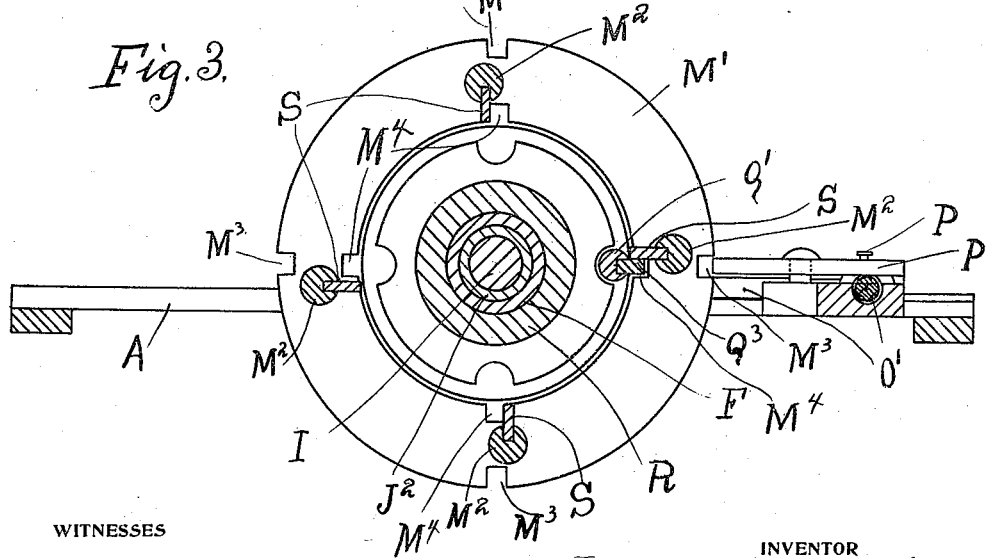
WITNESSES
INVENTOR
Lewis T. Rhoades
BY
ATTORNEY.

UNITED STATES PATENT OFFICE.

LEWIS TREGO RHOADES, OF PHŒNIXVILLE, PENNSYLVANIA.

TRANSMISSION-GEAR FOR AUTOMOBILES AND OTHER MACHINERY.

934,016.

Specification of Letters Patent.   Patented Sept. 14, 1909.

Application filed January 3, 1908.   Serial No. 409,207.

*To all whom it may concern:*

Be it known that I, LEWIS TREGO RHOADES, a citizen of the United States, residing at Phœnixville, in the county of Chester and State of Pennsylvania, have invented a certain new and useful Improvement in Transmission-Gears for Automobiles and other Machinery, of which the following is a specification.

My invention relates to a new and useful improvement in transmission gears for automobiles and other machinery where it is desired to increase or reduce the speed from a driving shaft to a driven shaft, or reverse the latter, and has for its object to provide a simple and effective mechanism in which the gears are always in mesh and which by the movements of a shifting rod will produce two forward speeds or one reverse speed.

A further object of my invention is to so construct such a mechanism as to avoid the necessity of submerging the gearing in oil, thus doing away with the usual closed casing for this purpose.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a sectional plan view showing the various parts in their relative positions. Fig. 2, a section at the line $x$—$x$ looking in the direction of the arrows. Fig. 3, a section at the line $y$—$y$.

In carrying out my invention as here embodied, A represents a frame, which may be of any design or construction for supporting the various parts of the mechanism, and B is a bearing upon the forward portion of this frame, in which is journaled the hub C of the bevel pinion D, and the forward end of this hub has attached thereto the swivel connection E, to which in turn any suitable power or drive shaft is connected. In automobile practice this suitable connection leads to the engine shaft.

F represents a sleeve, which is journaled in the hub C, terminating at the washer disk G, and H is a corresponding sleeve extending from said washer disk rearward and journaled in the bearing B' located upon the rear portion of the frame A beyond which bearing said sleeve may be attached to the mechanism to be driven such as the gearing of the rear wheels of an automobile. A shaft I extends through the center of the two sleeves and is held out of contact with the same by the bushings J, J', J², and J³, thus leaving a space within the sleeves adapted to contain oil, grease or other lubricant, which may be fed to the bearings through suitable openings. This shaft is intended to hold the sleeves in alinement and sustain the strains incident to the thrusts of the gears and the operation of the mechanism.

K is a spider, secured upon the sleeve F so as to revolve thereon, and upon the arms of this spider are journaled the bevel-gears L, here shown as two in number, and these gears are set at such an angle as to mesh with the bevel pinion D and the beveled gear M, the latter being journaled upon the sleeve F, so as to revolve independently thereof.

Around the spider is secured a clutch ring N, having notches N' formed in one edge thereof with which the clutch block O is adapted to engage. The object of this engagement is to hold the spider against rotation for the purpose hereinafter set forth. The beveled gear M also has secured thereto the clutch ring M', by means of the studs M², and this clutch ring has notches M³ formed in its outer periphery with which the clutch lever P is adapted to engage for holding the crown gear against rotation.

Q represents the collar secured upon the forward end of the sleeve H, and through this collar passes the clutch pin Q', the rear end of said pin being secured to the sliding collar Q² adapted to be moved longitudinally by the shifting rod O'. The forward end of this pin is adapted to enter into engagement with notches formed in the collar R, which is secured upon the rear end of the sleeve F, and when this engagement takes place the two sleeves will be locked together and revolve in unison, for the purpose hereinafter set forth.

The pin Q' has projecting from its inner end a lug Q³, which on its extreme forward movement will engage with the lugs S carried by the crown gear and thus cause said gear to revolve with the collar R, and consequently the sleeve F. Upon the extreme backward movement of the pin Q' the lug Q³ will enter into engagement with one of the notches M⁴ formed in the inner periphery of the clutch ring M', thereby locking the crown gear M to the collar Q, but freeing the collar R so that thereafter the crown gear and sleeve H will revolve together, while the sleeve F is freed.

The shifting rod O' is guided in suitable bearings supported by the frame, and is connected to the clutch lever P by the pin P' projecting therefrom through a slide in the lever, as clearly shown, so that the to and fro sliding movements of this shifting rod will swing the clutch lever upon its pivot carrying it into and out of engagement with the notches in the outer periphery of the clutch ring M', and this rod may be connected with a suitable hand lever so arranged as to move and stop it in three different positions, namely, an extreme forward position, a central position or an extreme rear position, and these three positions of this shifting rod will determine the speed and direction of the driven sleeve H relative to the speed and direction of the bevel gear D, and as the latter is intended always to revolve in one direction, the driven sleeve according to the adjustment of the shifting rod will be caused to revolve either at the same rate of speed as the bevel gear in the same direction therewith, or at a lower rate of speed in the same direction, or in the opposite direction at a lower rate of speed, as will next be explained.

Assuming that the swivel connection E is being revolved in the direction of the arrow marked thereon and the shifting rod is in its extreme forward position, as shown in Fig. 1, the bevel gear D will be locked through the intervening mechanism to the driven sleeve H, and consequently this driven sleeve will revolve in the same direction and at the same speed as the bevel gear. This locking of the bevel gear to the driven sleeve H being effected as follows: When the shifting rod is moved to its extreme forward position, the sliding collar Q² will have carried the pin Q' into engagement with the collar R, and the lug Q³ carried by said pin will also have passed into engagement with one of the lugs S, thus locking the collar Q to the collar R and also locking the crown gear M to these collars, and as the spider carrying the bevel gears L and the collar R are stationary upon the sleeve F, it follows that the bevel gear D and beveled gear M will be prevented from independent rotation and that the bevel gears L will have no rotation upon their axes, but simply turn with the spider, thus transmitting the speed and power direct from the bevel gear D to the driven sleeve H. When the shifting rod is moved to its central position it will carry the pin Q' out of engagement with the lugs Q³, thereby freeing the beveled gear M from the collar R, but as this pin does not pass out of engagement with the collar R the latter will remain locked to the collar Q and consequently the sleeves F and H will be rigidly connected, thereby causing the sleeve H to revolve in the same direction and at the same rate of speed as the spider K. At the same time the clutch lever P will be swung into enagagement with one of the outer notches of the ring M', thereby locking the beveled gear M against rotation. When this takes place the revolving of the bevel pinion D will revolve the bevel gears L, which being in mesh with the beveled gear M and the latter being held stationary will cause the gear wheels to travel around the beveled gear M, carrying with them the spider, which will thus be rotated upon its axis, carrying with it the sleeve to which it is secured, and through the collars R and Q, revolving the sleeve H in the same direction and at the same rate of speed as the rotation of the spider.

The bevel pinion D, gears L and beveled gear M form a sun and planet train, and the speed of the sleeve F relative to the speed of the bevel pinion D will be in proportion to the diameter of the beveled gear M relative to the bevel pinion, minus the lost motion between the spider and this beveled gear M and pinion, that is to say, if the bevel pinion and beveled gear M were of the same diameter then the spider would rotate upon its axis one revolution for every two revolutions of the bevel pinion. But as here shown, the bevel pinion is of smaller diameter than the beveled gear M, and consequently the speed between the bevel pinion and the spider will be further reduced in proportion, as these diameters differ, and in this case is approximately two to one. Thus when the bevel pinion makes three revolutions the spider will make but one revolution, therefore the sleeve H through its connection with the spider will be revolved in the same direction and at one-third of the speed of the bevel pinion.

When the shifting rod is moved to its extreme rear position the clutch block O will pass into engagement with one of the notches in the ring N secured to the spider, thereby locking the latter against rotation. This movement of the shifting rod will also carry the pin Q out of engagement with the collar R, carrying the lug Q³ into engagement with the notches M⁴, on the inner periphery of the ring M', thus locking the beveled gear M to the collar Q and causing the sleeve H to revolve with said gear. This movement likewise carries the clutch lever P out of engagement with the clutch ring M', freeing the latter in order that it may revolve with said beveled gear. When the mechanism is in this adjustment the revolving of the bevel pinion D will revolve the beveled gear M through the gears L but in a reverse direction and at a speed reduced in proportion, as the bevel pinion bears relation in diameter to the beveled gear M, thus giving the driven sleeve H a reverse movement to that of the bevel pinion and at less speed.

From the foregoing description it will be obvious that while the gears always remain in mesh, two forward speeds may be given to the driven sleeve and also a reverse motion, and in automobile practice this is of great importance since it overcomes the tendency to strip the gears and makes the changing of the speeds for running the machine forward and the reversing more effective.

Of course I do not wish to be limited to the details of construction here shown, as these may be varied within certain limits without departing from the spirit of my invention.

Having thus fully described my invention, what I claim as new and useful, is—

1. A transmission gearing comprising in combination, a suitable frame, a pinion journaled upon said frame, a spider adapted to revolve around the axial line of said pinion, gears journaled upon said spider and meshing with said pinion, a beveled gear also journaled upon the axial line of said pinion and meshing with said gears, a continuous shaft occupying said axial line of said pinion and forming an inner bearing for said pinion, and beveled gear, said shaft also having said spider keyed thereon, whereby to support said spider for revolution and means for interlocking said pinion, spider and gear to change their relative movement and speeds.

2. A transmission gearing, comprising in combination, a suitable frame, a pinion journaled upon said frame, a shaft revoluble in said pinion, a spider secured on said shaft, gears mounted on said spider and meshing with said pinion, a bevel gear revoluble on said shaft and meshing with said gears, means for locking said spider against rotation and for interlocking said spider, pinion and gears to cause said bevel gear to rotate in either direction and at various speeds.

3. In a mechanism of the character described, a suitable frame, a pinion journaled upon said frame, a spider adapted to revolve around the axial line of said pinion, gears journaled upon the spider and meshing with said pinion, a bevel-gear also journaled upon the axial line of said pinion and meshing with said gears, and means operative simultaneously on said spider and said bevel gear to interlock or independently lock them against rotation.

4. In a mechanism of the character described, the combination of a suitable frame, a bevel pinion journaled upon said frame, a sleeve journaled within the pinion, a driven sleeve journaled upon the same axial line as the first named sleeve, a spider secured upon the first named sleeve, bevel gears L journaled upon said spider and meshing with the bevel pinion, a beveled gear M journaled upon the first named sleeve and meshing with the bevel gears L, means for locking the spider against rotation or freeing the same, a collar carried by said driven sleeve, and means for locking the first named sleeve and said collar to the beveled gear.

5. In a mechanism of the character described, the combination of a suitable frame, a bevel pinion journaled upon said frame, a sleeve journaled within the pinion, a driven sleeve journaled upon the same axial line as the first named sleeve, a spider secured upon the first named sleeve, bevel gears journaled upon said spider and meshing with the bevel pinion, a beveled gear M journaled upon the first named sleeve and meshing with the bevel gears, means for locking the spider against rotation or freeing the same, a collar carried by the driven sleeve and means for locking the first named sleeve and said collar to the beveled gear M and a shifting rod for operating said locking and unlocking means.

6. The herein described combination of a suitable frame, a bevel pinion journaled upon said frame, a sleeve F journaled in the bevel pinion, a sleeve H journaled in the same axial line with the first named sleeve, an idle shaft running through both sleeves, a spider secured upon the sleeve F, bevel gears journaled upon said spider and meshing with the bevel pinion, a beveled gear M journaled upon the sleeve F so as to revolve independent thereof and meshing with the bevel gears, a clutch ring carried by the spider by means of which the latter may be locked against rotation, a collar secured upon the rear end of the sleeve F, a corresponding collar secured upon the forward end of the sleeve H, a clutch ring carried by the beveled gear M and means for either locking the two collars together, or locking the two collars and the beveled gear M together, or locking the beveled gear M to the frame, or locking the spider to the frame, and a shifting rod adapted to operate said locking and unlocking means as and for the purpose set forth.

7. In a changeable speed gearing, the combination of a suitable frame, a bevel pinion journaled upon said frame, a sleeve F fitted to revolve upon the axial line of said pinion independent thereof, a spider secured upon the sleeve, bevel gears journaled upon the spider and meshing with the bevel pinion, a beveled gear M mounted upon the sleeve so as to revolve independent thereof, said beveled gear M meshing with the bevel gears, a clutch ring secured to the spider and having notches therein whereby the spider may be locked against rotation in order that the revolving of the bevel pinion will revolve the beveled gear M through the bevel gears, a driven sleeve H journaled in the same axial line as the sleeve F and mechanism for locking the beveled gear M to the sleeve H when the spider is locked against rotation, as specified.

8. In a changeable speed gearing, the combination of a suitable frame, a bevel pinion journaled upon said frame, a sleeve journaled upon the axial line of the pinion, a beveled gear M journaled upon said sleeve, means for locking said beveled gear M against rotation, a spider secured to the sleeve, bevel gears journaled upon the spider and meshing with the pinion and beveled gear M, a driven sleeve H journaled upon the same axial line as the sleeve F and a clutch mechanism for locking the two sleeves together, as and for the purpose set forth.

In testimony whereof, I have hereunto affixed my signature in the presence of two subscribing witnesses.

LEWIS TREGO RHOADES.

Witnesses:
P. W. KING,
A. D. HUFF.